(12) United States Patent
Chang

(10) Patent No.: US 7,659,884 B2
(45) Date of Patent: Feb. 9, 2010

(54) BATTERY-RECEIVING STRUCTURE OF WIRELESS MOUSE

(76) Inventor: Yuan-Jung Chang, 4F, No. 228, Min An Rd., Hsinchuang City, Taipei Hsien (TW)

(*) Notice: Subject to any disclaimer, the term of this patent is extended or adjusted under 35 U.S.C. 154(b) by 1243 days.

(21) Appl. No.: 10/994,396

(22) Filed: Nov. 23, 2004

(65) Prior Publication Data
US 2006/0109247 A1 May 25, 2006

(51) Int. Cl.
*G09G 5/08* (2006.01)

(52) U.S. Cl. ............... 345/163; 345/156; 345/157; 345/905

(58) Field of Classification Search ............ 345/156, 345/157, 163, 905
See application file for complete search history.

(56) References Cited

U.S. PATENT DOCUMENTS 6,225,981 B1 * 5/2001 Lu .................... 345/164

| | | | |
|---|---|---|---|
| 2003/0160764 A1 * | 8/2003 | Kuan ................. | 345/163 |
| 2004/0017358 A1 * | 1/2004 | Kuo .................. | 345/163 |
| 2004/0119694 A1 * | 6/2004 | Chen et al. ............ | 345/163 |
| 2004/0189604 A1 * | 9/2004 | Lee .................. | 345/163 |
| 2005/0012719 A1 * | 1/2005 | Su ................... | 345/163 |
| 2005/0219208 A1 * | 10/2005 | Eichenberger et al. ...... | 345/157 |

* cited by examiner

*Primary Examiner*—Amare Mengistu
*Assistant Examiner*—Vince E Kovalick
(74) *Attorney, Agent, or Firm*—Rosenberg, Klein & Lee

(57) ABSTRACT

A battery-receiving structure of a wireless mouse has a front section structure belonging to a front part and a receiving structure belonging to a rear part. The receiving structure has a first latching part, a second latching part, a seat body with multiple battery holes and an upper cover covering the seat body. A first latching body and a second latching body are set inside the upper cover corresponding to the first latching part and the second latching part. Meanwhile, the first latching body and the second latching body are latched to the first latching part and the second latching part. An existent upper cover is used as a battery cover; therefore, the battery cover does not need not to be molded additionally and the cost is lowered. In addition, the space inside the mouse is also fully used.

7 Claims, 4 Drawing Sheets

BATTERY-RECEIVING STRUCTURE OF WIRELESS MOUSE

BACKGROUND OF THE INVENTION

1. Field of the Invention

The present invention is related to a battery-receiving structure of a wireless mouse, especially to a wireless mouse with an existent upper cover thereof reconstructed as a battery cover.

2. Description of Related Art

Using products with wireless technology is a trend for people in the future. A wireless mouse is an example of various wireless products.

A prior art wireless mouse uses a concave part under the base of the mouse for receiving batteries, and molds a battery cover for covering the batteries. Therefore, the cost for making a mouse is higher because of molding a battery cover additionally, and the space in the wireless mouse is not fully used. Besides, the battery cover on the bottom of the mouse can be lost easily after it is opened, and changing the batteries is also not convenient.

SUMMARY OF THE INVENTION

The object of the present invention is to reconstruct an existent upper cover of the wireless mouse into a battery cover. Further, the present invention does not require additional molding of a battery cover; thus, the cost is lowered and the upper cover cannot be lost easily. Furthermore, the upper cover latches onto the wireless mouse effectively and changing batteries is more convenient due to this kind of structure.

To achieve the above-mentioned object, the present invention provides a battery-receiving structure of a wireless mouse, which is composed of a front section structure belonging to a front part and a receiving structure belonging to a rear part. The receiving structure comprises a seat body with a first latching part, a second latching part and multi battery planting holes, and an upper cover covering the seat body. A first latching body and a second latching body are set inside the upper cover and corresponding to the positions of the first latching part and the second latching part, respectively; the first latching body and the second latching body are latched to the first latching part and the second latching part.

To provide a further understanding of the invention, the following detailed description illustrates embodiments and examples of the invention, this detailed description being provided only for illustration of the invention.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Figure 1:
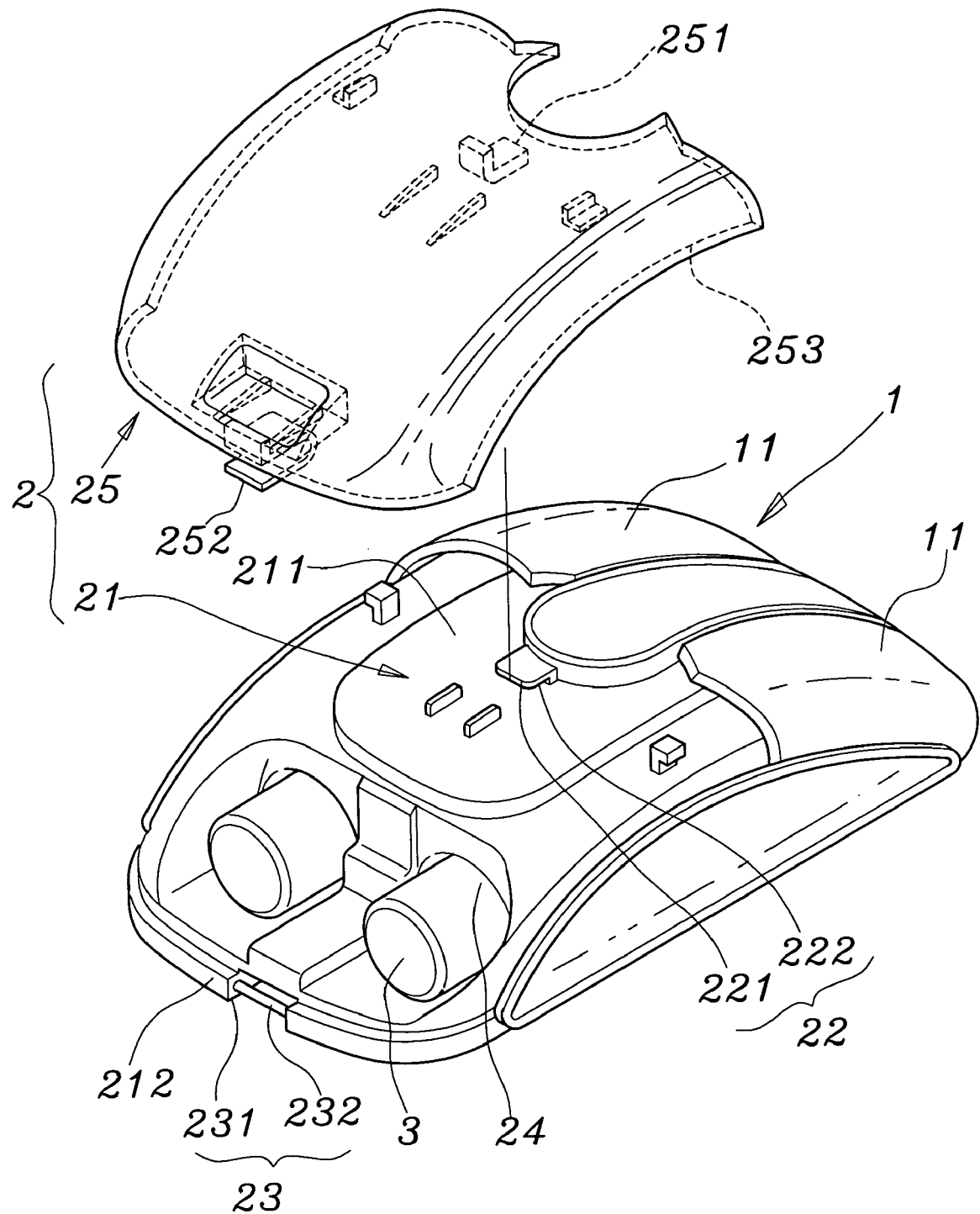
FIG. 1 shows an exploded diagram of the present invention.
Figure 2:
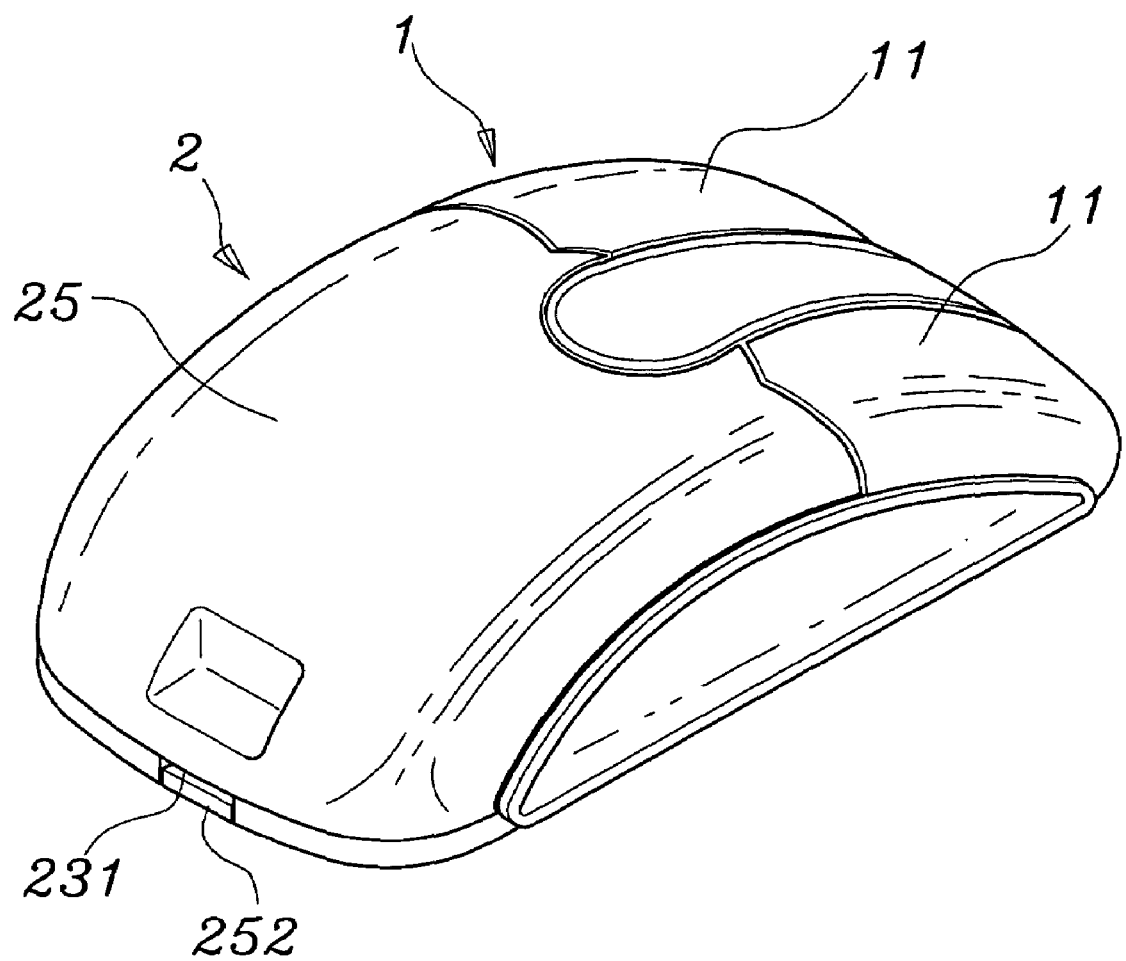
FIG. 2 shows a combination diagram of the present invention.
Figure 3:
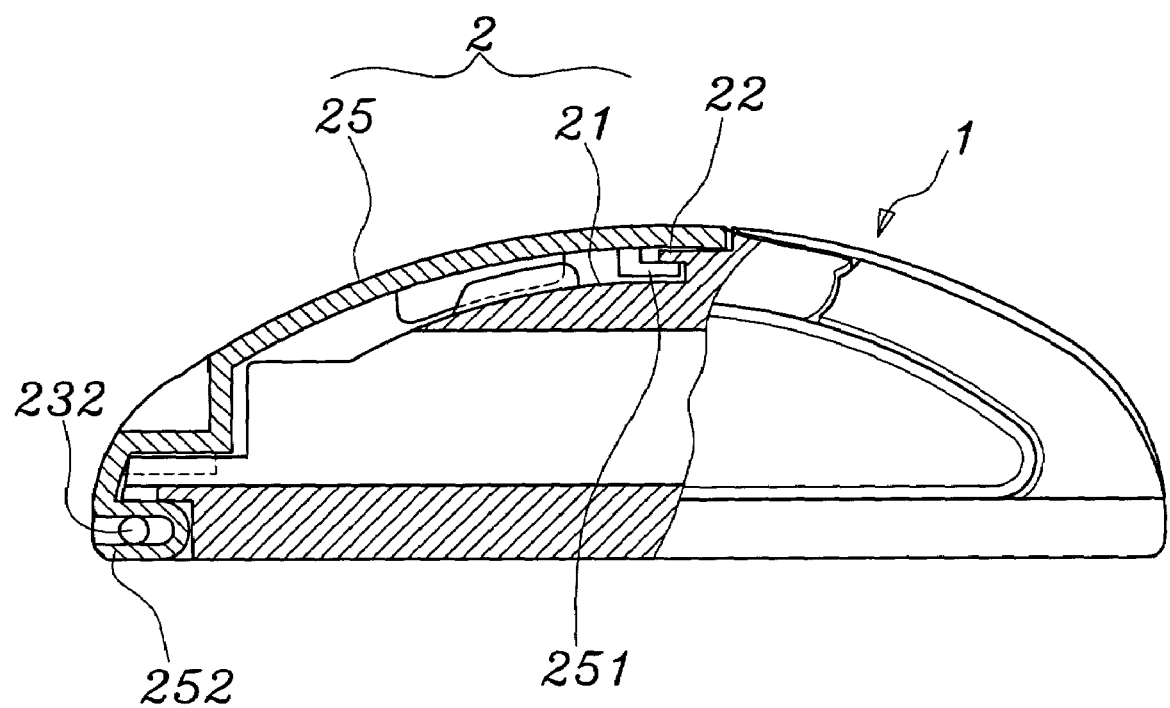
FIG. 3 shows a cutaway diagram of a part of the present invention.

Reference is made to FIGS. 1-6. The present invention provides a battery-receiving structure of a wireless mouse. The wireless mouse is composed of a front section structure 1 belonging to a front part of the wireless mouse and a receiving structure 2 belonging to a rear part of the wireless mouse. The front section structure 1 comprises a plurality of key bodies 11. In addition, a wheel can also be appended to the wireless mouse.

The receiving structure 2 includes a seat body 21 set in the rear part of the wireless mouse, and an upper cover 25 to cover the seat body 21. Further, the upper cover 25 can be opened glidingly, shifted pivotally, closed pivotally and latched glidingly.

The seat body 21 comprises a first latching part 22, a second latching part 23 and a plurality of battery planting holes 24; batteries 3 can be placed in the battery planting holes 24. Additionally, a first latching body 251 and a second latching body 252 are set on an inside surface 253 of the upper cover 25 and correspond to the first latching part 22 and the second latching part 23, respectively. Therefore, the first latching body 251 and the second latching body 252 can be latched on the first latching part 22 and the second latching part 23, respectively.

Figure 4:
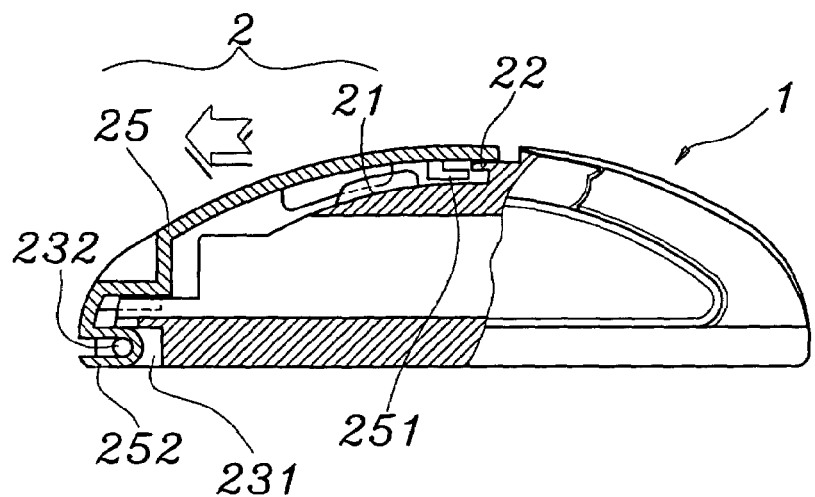
FIG. 4 shows an operation schematic diagram 1 of the present invention (opened glidingly)
Figure 5:
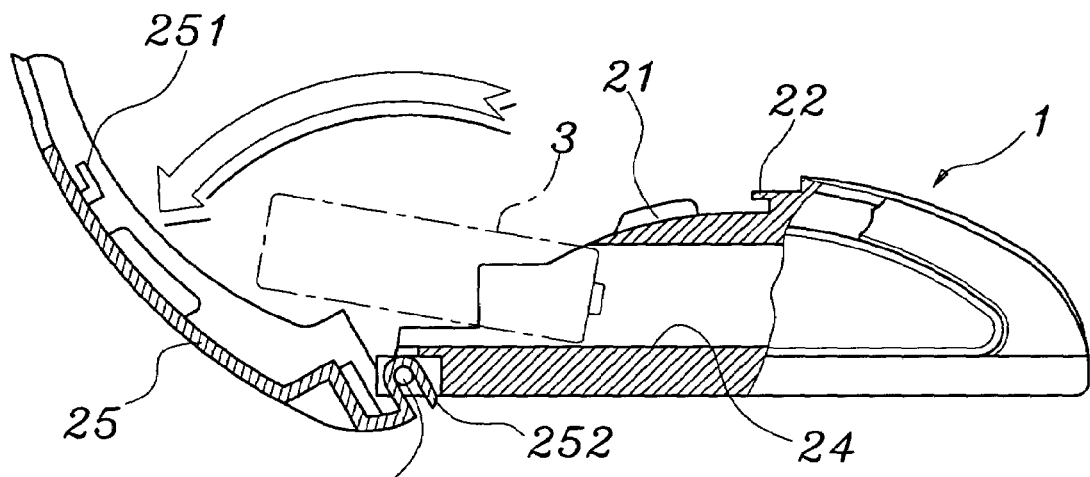
FIG. 5 shows an operation schematic diagram 2 of the present invention (opened pivotally)
Figure 6:
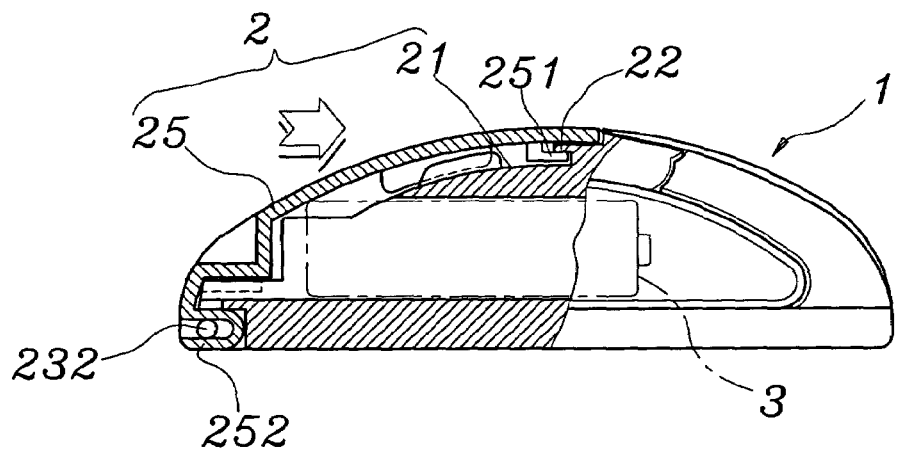
FIG. 6 shows an operation schematic diagram 3 of the present invention (latched glidingly).

The first latching port 22 is set on a top surface 211 of the seat body 21, and the first latching part 22 comprises a protrusion 221 protruding transversely from the seat body 21 and an inserted groove 222 formed between the protrusion 221 and the seat body 21. Moreover, the first latching body 251 of the upper cover 25 is glidingly inserted into a corresponding shape inside the inserted groove 222. The second latching part 23 is set at the rear part 212 of the seat body 21, and the second latching part comprises a concave part 231 formed on the seat body 21 and a rod 232 bonded across the concave part 231. Additionally, the second latching body 252 is accepted inside the concave part 231, and the rod 232 inside the concave part 231 is set within a range for being latched with the second latching part 252. In the embodiment of the present invention, the second latching body 252 of the upper cover 25 is hairpin-shaped, and the rod 232 is loosely set inside the second latching body 252. Meanwhile, a direction of the opening of the second latching body 252 (opened external part) is the same as the direction to open the upper cover 25. In other word, when the upper cover 25 is opened glidingly, the rod 232 is blocked by a closed inner part of the second latching part 252 (as FIG. 4 shows), and the upper cover 25 cannot be moved in the same direction. At this time, the upper cover 25 is opened pivotally by viewing the rod 232 as a pivot (as FIG. 5 shows), and the batteries 3 can be exchanged easily. Then, the upper cover 25 is closed pivotally by viewing the rod 232 as a pivot again, and the upper cover 25 is latched by being glided in the direction opposite to the above-mentioned direction (as FIG. 6 shows).

As in the above-mentioned structure of the present invention, the upper cover 25 is latched on the second latching part 23 of the seat body 21 by the second latching body 252; hence, the upper cover cannot be lost easily. The present invention does not require additional molding of a battery cover and uses the existent upper cover 25 of the mouse; thus, the cost is lowered and the space inside the mouse is fully used. Furthermore, because the upper cover 25 is set on the top side of the wireless mouse, exchanging batteries 3 is more effective.

Placement and retrieval of the batteries from the battery planting holes 24 are also ergonomic.

There has thus been described a new, novel and heretofore unobvious mouse which eliminates the aforesaid problem in the prior art. Furthermore, those skilled in the art will readily appreciate that the above description is only illustrative of specific embodiments and examples of the invention. The invention should therefore cover various modifications and variations made to the herein-described structure and operations of the invention, provided the fall within the scope of the invention as defined in the following appended claims.

What is claimed is:

1. A battery-receiving structure of a wireless mouse, composed of a front section structure belonging to a front part and a receiving structure belonging to a rear part, the battery-receiving structure comprising:
    a seat body with a first latching part, a second latching part and multiple battery insertion holes; and
    an upper cover covering the seat body, a first latching body and a second latching body set inside the upper cover corresponding to positions of the first latching part and the second latching part, respectively, wherein the first latching body and the second latching body are latched to the first latching part and the second latching part, the first latching part including a protrusion protruding transversely from the seat body, and an inserted groove formed between the protrusion and the seat body, and the first latching body of the upper cover glidingly inserts into a corresponding shape inside the inserted groove.

2. The battery-receiving structure of a wireless mouse as in claim 1, wherein the first latching part is set on a top surface of the seat body.

3. The battery-receiving structure of a wireless mouse as in claim 1, wherein the front section structure of the wireless mouse comprises a plurality of key parts.

4. The battery-receiving structure of a wireless mouse as in claim 1, wherein the front section structure of the wireless mouse comprises a rolling wheel.

5. A battery-receiving structure of a wireless mouse composed of a front section structure belonging to a front part and a receiving structure belonging to a rear part, the battery-receiving structure comprising:
    a seat body with a first latching part, a second latching part and multiple battery insertion holes; and
    an upper cover covering the seat body, a first latching body and a second latching body set inside the upper cover corresponding to positions of the first latching part and the second latching part, respectively, wherein the first latching body and the second latching body are latched to the first latching part and the second latching part, the second latching part including a concave part formed on the seat body, and a rod bonded across the concave part, and the second latching body being accepted inside the concave part, the rod inside the concave part being set within a range for being latched with the second latching part, and the upper cover being latched by moving in one direction and opened in another direction.

6. The battery-receiving structure of a wireless mouse as in claim 5, wherein the second latching body of the upper cover is hairpin-shaped, and a direction of the opening of the second latching body is identical to the direction to open the upper cover.

7. The battery-receiving structure of a wireless mouse as in claim 5, wherein the second latching part is placed in a tail of the seat body.

* * * * *